Sept. 16, 1930.  G. MEYERS  1,775,941
DEVICE FOR PILING LOGS
Filed Sept. 29, 1927
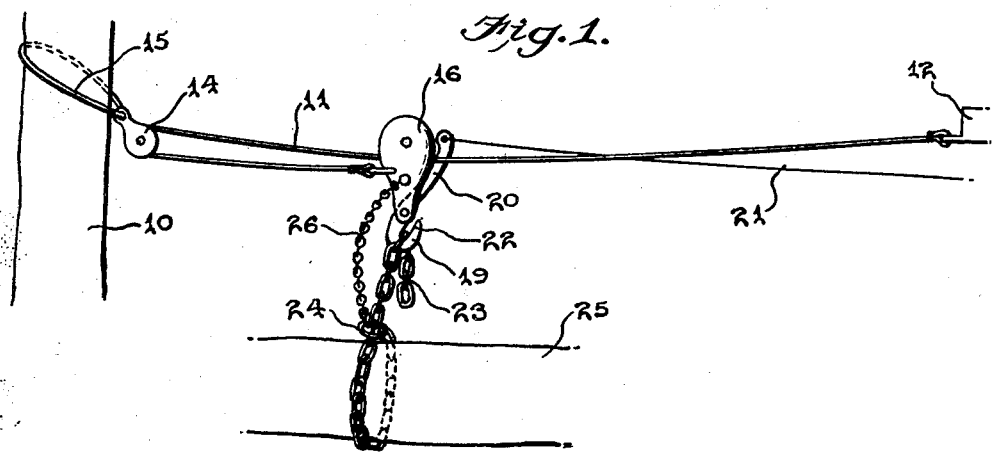
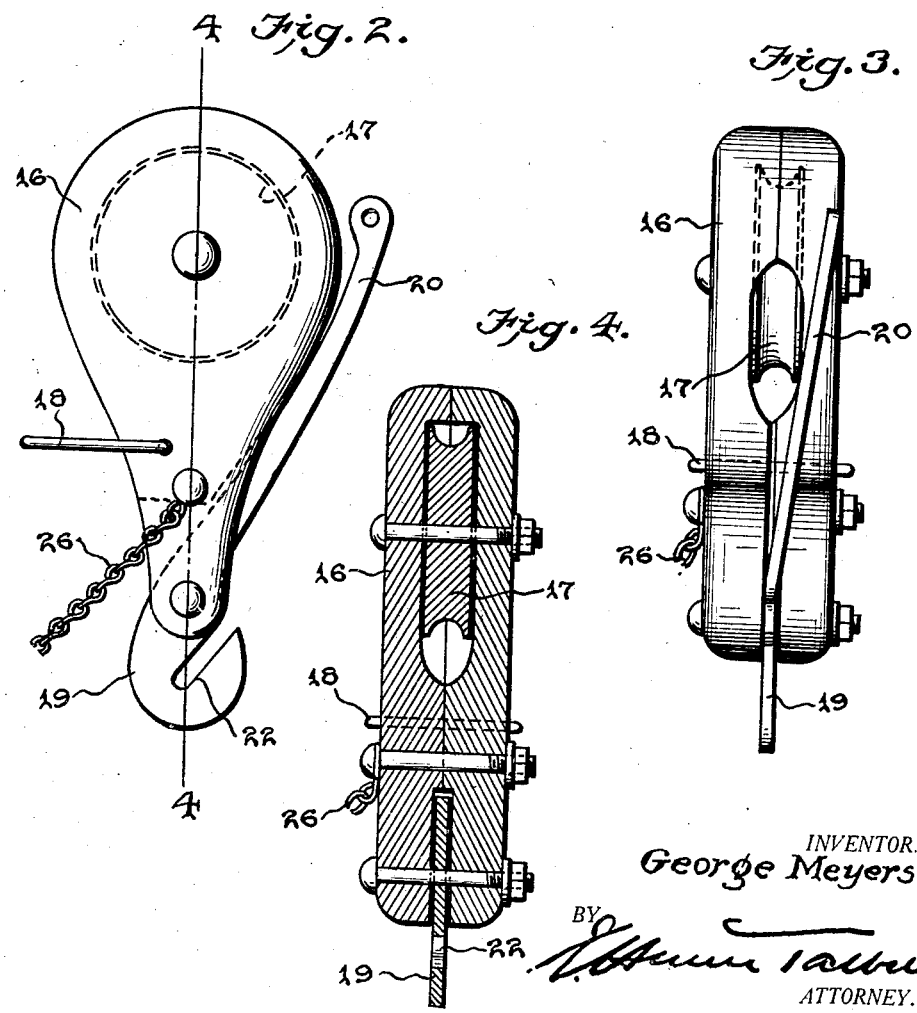
INVENTOR.
George Meyers
BY
ATTORNEY.

Patented Sept. 16, 1930

1,775,941

UNITED STATES PATENT OFFICE

GEORGE MEYERS, OF CATHLAMET, WASHINGTON

DEVICE FOR PILING LOGS

Application filed September 29, 1927. Serial No. 222,796.

The object of the invention is to provide a device by means of which logs may be carried to and automatically deposited at a fixed point, so that the dangers attendant on the manual release of the logs from the conveying means may be avoided; and to provide for use in connection with a donkey engine a conveying means which is of simple form and therefore may be easily manufactured and marketed at low cost.

With this object in view, the invention consists in a construction and combination of parts of which a preferred embodiment is illustrated in the accompanying drawings, wherein:

Figure 1 is a view in side elevation of the invention.

Figure 2 is an enlarged detail side elevational view of the block constituting the conveyor and its grapple chain.

Figure 3 is an edge elevational view of the block.

Figure 4 is a central vertical sectional view on the plane indicated by the line 4—4 of Figure 2.

In logging operations it is customary to carry the logs from the woods and deposit them at a certain point and in carrying out the present invention a tree 10 is selected as the point of deposit. A cable 11 extends from the donkey engine 12 around a block 14 secured to the tree as by means of a chain 15. Mounted on the cable 11 is a conveyor block 16, the latter carrying a grooved pulley 17 traversing the cable, the extremity of the cable remote from the donkey engine being secured to the block by connection with the clevis 18 on the latter.

The block is provided with a swinging hook 19, the latter having a tail extension 20 with the extremity of which a trip cord 21 is connected. The throat 22 of the hook is designed for the reception of any one of the links of a grapple chain 23 which at one terminal is provided with a ring 24 through which the end of the chain may be extended when the latter is disposed in surrounding relation to a log 25 as indicated in Figure 1 of the drawing. The hook under such conditions maintains the weight of the log and transfers it to the block 16 from which it is transferred to the upper run of the cable 11 when the latter is tensioned by the movement of the donkey engine. Thus the log is transferred from the point at which the grapple chain is applied to its point of deposit adjacent the tree 10 when, if the trip line 21 be anchored at such a point that a pull will be applied upon it when the block 16 is adjacent the tree, the tail of the hook will be swung from its normal position adjacent the block to a horizontal position, when the link of the grapple chain will be released, thus permitting the chain to free itself from the log and the latter to be deposited on the ground or on the pile of previously placed logs. The trip line may be then employed as a means to transfer the block 16 back to the point where another log may be secured to it by means of the grapple chain.

A small tether chain 26 secured to the block and attached to the grapple chain constitutes a means to retain the grapple chain connected with the block after its release from the hook.

If desired, the trip line 21 may be carried by the operator of the donkey engine, so that the hook may be manually actuated by him to release the log after it has been transferred by the block to the point of deposit.

The device avoids entirely the necessity for having an attendant at the pile of logs for the release of logs as they are transferred to the pile.

The invention having been described, what is claimed as new and useful is:

A device for the purpose indicated comprising a cable, an anchor block with which the cable has a running engagement, a conveyor block with which one terminal of the cable is connected, the conveyor block traversing an intermediate portion of the cable, log grappling means carried by the block, and an automatic releasing device for the grappling means, the grappling means comprising a chain for encircling a log and the releasing means comprising a hook in the throat of which the links of the chain are selectively engageable, and a trip cord connected at the extremity of a tail extension of the hook and having its remote end anchored at such a distance from the anchor block as to exert a pull on the cord when the conveyor block reaches a position adjacent the anchor block.

In testimony whereof he affixes his signature.

GEORGE MEYERS.